United States Patent
Xiao et al.

(10) Patent No.: US 9,046,342 B2
(45) Date of Patent: Jun. 2, 2015

(54) COAXIAL CABLE BRAGG GRATING SENSOR

(75) Inventors: Hai Xiao, Rolla, MO (US); Jun Fan, Rolla, MO (US); Tao Wei, Rolla, MO (US); Songping Wu, Santa Clara, CA (US)

(73) Assignee: HABsonic, LLC, Rolla, MO (US)

( * ) Notice: Subject to any disclaimer, the term of this patent is extended or adjusted under 35 U.S.C. 154(b) by 448 days.

(21) Appl. No.: 13/437,770

(22) Filed: Apr. 2, 2012

(65) Prior Publication Data

US 2012/0272741 A1 Nov. 1, 2012

Related U.S. Application Data

(60) Provisional application No. 61/516,348, filed on Apr. 1, 2011.

(51) Int. Cl.
- *G01L 19/06* (2006.01)
- *G01R 31/02* (2006.01)
- *G01L 1/24* (2006.01)
- *G01B 7/16* (2006.01)
- *G01L 5/04* (2006.01)

(52) U.S. Cl.
CPC ... *G01B 7/16* (2013.01); *G01L 5/04* (2013.01); *G01L 1/246* (2013.01)

(58) Field of Classification Search
CPC H01L 41/087; G01M 5/0025; G01M 5/0041; G01M 5/0083; G01B 7/16; G01L 5/04
USPC ............. 174/28; 73/862.451, 774; 324/534; 340/665
See application file for complete search history.

(56) References Cited

U.S. PATENT DOCUMENTS

| | | | | |
|---|---|---|---|---|
| 3,763,482 A * | 10/1973 | Burney et al. | | 340/564 |
| 3,862,477 A * | 1/1975 | Ayers et al. | | 29/25.35 |
| 3,921,125 A * | 11/1975 | Miller et al. | | 367/169 |
| 4,183,010 A * | 1/1980 | Miller | | 367/154 |
| 4,598,168 A * | 7/1986 | Wagner et al. | | 174/115 |
| 4,629,925 A * | 12/1986 | Booth et al. | | 310/330 |
| 6,452,105 B2 * | 9/2002 | Badii et al. | | 174/102 R |
| 6,696,974 B1 * | 2/2004 | Mathis | | 340/854.7 |
| 6,800,809 B2 * | 10/2004 | Moe et al. | | 174/102 R |
| 6,849,799 B2 * | 2/2005 | Springer et al. | | 174/28 |
| 7,421,910 B2 * | 9/2008 | Chen et al. | | 73/862.451 |

(Continued)

OTHER PUBLICATIONS

Ang, J., Li, H.C.H., Herszberg, L, Bannister, M.K., Mouritz, A.P., "Tensile Fatigue Properties of Fiber Bragg Grating Optical Fibre Sensors," International Journal of Fatigue, vol. 32, pp. 762-768, 2010.

(Continued)

*Primary Examiner* — Lisa Caputo
*Assistant Examiner* — Jonathan Dunlap
(74) *Attorney, Agent, or Firm* — Senniger Powers LLP

(57) ABSTRACT

A coaxial cable sensor device with periodic impedance discontinuities along the length of its cable. The cable comprises an inner conductor, insulating material disposed around the length of the inner conductor, and an outer conductor disposed around the insulating material. The periodic impedance discontinuities are created by physical deformations or material alterations to at least one of the inner conductor, the outer conductor, and the insulating material. The sensor device may be used to measure temperature, pressure, strain, and acoustic waves in building structures, and is well suited for down-hole or underwater applications.

18 Claims, 14 Drawing Sheets

(56) References Cited

U.S. PATENT DOCUMENTS

| | | | | |
|---|---|---|---|---|
| 7,495,450 | B2* | 2/2009 | Furse et al. | 324/519 |
| 7,804,385 | B2* | 9/2010 | Snyder | 333/207 |
| 2006/0086197 | A1* | 4/2006 | Chen et al. | 73/862.451 |
| 2012/0265184 | A1* | 10/2012 | Sliwa et al. | 606/15 |

OTHER PUBLICATIONS

Aoki, I. and Takahashi, T., "Material Flow Analysis on Shearing Process by Applying Fourier Phase Correlation Method—Analysis of Piercing and Fine-Blanking," Journal of Materials Processing Technology, vol. 134, pp. 45-52, 2003.

Biswas, P., Bandyopadhyay, S., Kesavan, K., Parivallal, S., Sundaram, B., "Investigation on Packages of Fiber Bragg Grating for Use as Embeddable Strain Sensor in Concrete Structure," Sensors and Actuators, A: Physical, vol. 157, pp. 77-83, 2010.

Chen, G., Mu, H., Pommerenke, D., Drewniak, J., "Continuous Coaxial Cable Sensors for Monitoring of RC Structures with Electrical Time Domain Reflectometry," San Diego, CA, 2003, pp. 410-421.

Chen, G. and Pommerenke, D., "Novel Distributed Cable Sensors for Detection of Cracks in RC Structures," Brunswick, ME, 2006, pp. 1343-1350.

Zhi, Z., Ou, G., Hang, Y., Chen, G., and Ou, J., "Research and Development of Plastic Optical Fiber Based Smart Transparent Concrete," San Diego, CA, 2009.

Chýlek, P. and Videen, G, "Scattering by a Composite Sphere and Effective Medium Approximations," Optics Communications, vol. 146, pp. 15-20, 1998.

Dupre, J., Cottron, M., Lagarde, A., "Grating Interrogations: From Small to Large Strain Measurement," Experimental Mechanics, vol. 35, pp. 153-158, 1995.

Erdogan, T., "Fiber Grating Spectra," Journal of Lightwave Technology, vol. 15, pp. 1277-1294, 1997.

Fielder, R., Duncan, R., Palmer, M., "Recent Advancements in Harsh Environment Fiber Optic Sensors: An Enabling Technology for Space Nuclear Power," San Diego, CA, 2005, pp. 476-484.

Haché, A. and Poirier, L., "Anomalous Dispersion and Superluminal Group Velocity in a Coaxial Photonic Crystal: Theory and Experiment," Physical Review E—Statistical, Nonlinear, and Soft Matter Physics, vol. 65, 2002.

Rosenberg, R. and Nahin, P., "Review of Oliver Heaviside, Sage in Solitude: The Life, Work, and Times of an Electrical Genius of the Victorian Age," Isis, vol. 80, pp. 322-324, 1989.

Haus, H. and Huang, W., "Coupled-Mode Theory," Proceedings of the IEEE, vol. 79, pp. 1505-1518, 1991.

Haus, H. Huang, W., Kawakami, S., Whitaker, N., "Coupled-Mode Theory of Optical Waveguides," Journal of Lightwave Technology, vol. LT-5, pp. 16-23, 1987.

Huang, H., Majumdar, A., Cho, S., "Fabrication and Evaluation of Hybrid Silica/Polymer Optical Fibre Sensors for Large Strain Measurement," Transactions of the Institute of Measurement and Control, vol. 31, pp. 247-257, 2009.

Huang, Y., Wei, T., Zhou, Z., Zhang, Y., Chen, G., Xiao, H., "An Extrinsic Fabry—Perot Interferometer-Based Large Strain Sensor with High Resolution," Measurement Science and Technology, vol. 21, p. 105308, 2010.

Kiesel, S., Peters, K., Hassan, H., Kowalsky, M., "Behavior of Intrinsic Polymer Optical Fiber Sensor for Large-Strain Applications," San Diego, CA, 2007.

Ko, J.M. and Ni, Y.Q., "Technology Developments in Structural Health Monitoring of Large-Scale Bridges," Engineering Structures, vol. 27, pp. 1715-1725, 2005.

Koledintseva, M.Y., DuBroff, R.E., Schwartz, R.W., "A Maxwell Garnett Model for Dielectric Mixtures Containing Conducting Particles at Optical Frequencies," Progress in Electromagnetics Research, vol. 63, pp. 223-242, 2006.

Kuang, K.S.C., Quek, S.T., Tan, C.Y., Chew, S.H., "Plastic Optical Fiber Sensors for Measurement of Large Strain in Geotextile Materials," vol. 47-50 Part 2, ed. Hong Kong, P.R., 2008, pp. 1233-1236.

Kuang, K.S.C., Quek, S.T., Koh, C.G., Cantwell, W.J., Scully, P.J., "Plastic Optical Fibre Sensors for Structural Health Monitoring: A Review of Recent Progress," Journal of Sensors, vol. 2009, 2009.

Leng, J. and Asundi, A., "Structural Health Monitoring of Smart Composite Materials by Using EFPI and FBG Sensors," Sensors and Actuators, A: Physical, vol. 103, pp. 330-340, 2003.

Li, H.N., Li,m D.S. and Song, G.B. "Recent Applications of Fiber Optic Sensors to Health Monitoring in Civil Engineering," Engineering Structures, vol. 26, pp. 1647-1657, 2004.

Little, B. Laine, J.P., and Haus, H., "Analytic Theory of Coupling From Tapered Fibers and Half-Blocks into Microsphere Resonators," Journal of Lightwave Technology, vol. 17, pp. 704-715, 1999.

Little, B., and Haus, H., "Variational Coupled-Mode Theory for Periodic Waveguides," IEEE Journal of Quantum Electronics, vol. 31, pp. 2258-2264, 1995.

Manolatou, C., Khan, M.J., Fan, S., Villeneuve, P.R. and Haus, H., "Coupling of Modes Analysis of Resonant Channel Add-Drop Filters," IEEE Journal of Quantum Electronics, vol. 35, pp. 1322-1331, 1999.

Rodrigues, C., Felix, C., Lage, A., and Figueiras, J. et al., "Development of a Long-Term Monitoring System Based on FBG Sensors Applied to Concrete Bridges," Engineering Structures, vol. 32, pp. 1993-2002, 2010.

Rotinat, R., Tie, R., Valle, V., Dupre, J.C., "Three Optical Procedures for Local Large-Strain Measurement," Strain, vol. 37, pp. 89-98, 2001.

Yariv, A., "Coupled-Mode Theory for Guided-Wave Optics," IEEE Journal of Quantum Electronics, vol. QE-9, pp. 919-933, 1973.

Sánchez-López, M.D., Davis, J., and Crabtree, K., "Coaxial Cable Analogs of Multilayer Dielectric Optical Coatings," American Journal of Physics, vol. 71, pp. 1314-1319, 2003.

Sánchez-López, M.M. et al., Sánchez-Meroño, A., Davise, J.A., and Moreno, I., "Observation of Superluminal and Negative Group Velocities in a Mach-Zehnder Interferometer," Applied Physics Letters, vol. 93, 2008.

Sánchez-López, M.M., Cos, J., Davis, J.A., Miller, D.A., Moreno, I., Velasquez, O., "Analysis of Coaxial Photonic Crystal Tranmittance of Fourier Transform," Seville, 2005, pp. 735-745.

Sawada, T. and Sakamoto, M., "High-Resolution Large-Strain Measurement of Plastically Deformed Specimen by Fourier Phase Correlation," International Journal of Mechanical Sciences, vol. 49, pp. 861-871, 2007.

Schedin, E. and Melander, A., "The Evaluation of Large Strains from Industrial Sheet Metal Stampings with a Square Grid," Journal of Applied Metalworking, vol. 4, pp. 143-156, 1986.

Schneider, G., Hanna, S., Davis, J., and Watson, G., "Defect Modes in Coaxial Photonic Crystals," Journal of Applied Physics, vol. 90, pp. 2642-2649, 2001.

Stroud, D., "Generalized Effective-Medium Approach to the Conductivity of an Inhomogeneous Material," Physical Review B, vol. 12, pp. 3368-3373, 1975.

Stroud, D., "The Effective Medium Approximations: Some recent developments," Superlattices and Microstructures, vol. 23, pp. 567-573, 1998.

Todd, M.D., Nicholds, J., Trickey, S., Seaver, M., Nichols, N., and Lawrence, N., "Bragg Grating-Based Fiber Optic Sensors in Structural Health Monitoring," Philosophical Transactions of the Royal Society A: Mathematical, Physical and Engineering Sciences, vol. 365, pp. 317-343, 2007.

* cited by examiner

COAXIAL CABLE BRAGG GRATING SENSOR

CROSS-REFERENCE TO RELATED APPLICATION

This application claims priority from U.S. Provisional Patent Application Ser. No. 61/516,348, filed Apr. 1, 2011, which is incorporated herein by reference in its entirety.

BACKGROUND

Each year in U.S., federal, state, and local governments spend billions of dollars to maintain, upgrade, repair, and renovate various civil structures such as buildings, bridges, dams, tunnels, pipelines and offshore platforms. The factors that affect the integrity of these large and complex civil infrastructures cannot be perfectly predicted. As a result, the degradation process of the structures must be monitored in some form. Embedded sensors have the most desired capability for structural health monitoring (SHM). These sensors are used for measurement of various structural and environmental parameters such as strain, force, crack, deflection, vibration, and corrosion under normal and extreme conditions for in situ assessment of the health of the structures.

Monitoring of structure integrity is technically challenging because these engineered structures are inherently large in dimension and geometrically complex. The general requirements on the monitoring technology include high resolution, large dynamic range, low cost, excellent reliability, and remote operation at a long working distance. However, current sensing technologies still have difficulty meeting these requirements. Therefore, there is a continuing need for developing new sensor technologies to address the challenges and ensure the safe operation of the nation's critical infrastructures.

The development of large strain sensors has recently attracted worldwide attentions. A significant challenge remains in achieving a large dynamic range while maintaining high resolution. Conventional strain sensors represented by electro-resistive strain gauges have a satisfactory resolution but a limited dynamic range of less than 1.5%. For strains higher than 2%, extensometers, linear variable differential transformers, and grating based mark tracking technique are commonly used. They can typically measure a strain of up to 5% with low resolution of 0.45%. A common issue associated with these large strain sensors is that these sensors are difficult to embed into a building structure due to the large size of the sensor transducer. Other issues include electrical wiring/connection, poor stability, and large temperature cross-sensitivity.

In the past two decades, fiber optic sensors have found many successful applications in SHM due to their unique advantages such as compactness, high resolution, immunity to electromagnetic interference, remote operation and multiplexing capability. In general, fiber sensors have relatively small dynamic ranges due to the limited deformability of silica glass. Various strain transfer mechanisms have been investigated to extend the dynamic range of the sensor devices. For example, through a specially-designed sensor package, a high strain resolution of 10µ∈ within a large dynamic range (12,000µ∈) has been demonstrated using an extrinsic Fabry-Perot interferometer (EFPI). However, when embedded into a structure, the signal transmission line, i.e., the optical fiber, can easily break when it is subjected to a large strain (about 10 m∈ or 1%) and/or a shear force, causing serious challenges for sensor installation and operation. As such, fiber optic sensors have restricted applications in heavy duty or large strain measurement.

For more robust transmission cables, plastic optical fibers have been explored for sensor development by taking the advantage of their inelastic nature. Plastic fiber sensors with a strain measurement range of up to 15.8% have been reported. However, current plastic fibers have poor optical transmission and wave-guiding properties, which makes it difficult to fabricate high performance sensors from plastic fibers. The strong thermo-optic coupling effect and a large thermal expansion coefficient have also resulted in a large temperature-strain cross sensitivity of the sensors.

A coaxial cable and an optical fiber are the two basic forms of wave-guiding structures that have been widely used in telecommunications for transmitting signals over a long distance. These two types of cables share the common fundamental physics governed by the same electromagnetic (EM) theory, except that the frequencies of the EM waves supported by them are quite different. In comparison with optical fibers, coaxial cables can survive a large longitudinal strain and are relatively resistant to lateral force and bending.

Prior research has already started to explore various coaxial cable devices mimicking their optical fiber counterparts. Inspired by the well-known optical fiber Mach-Zehnder interferometer (MZI), the coaxial cable based MZI implementations have been demonstrated and the superluminal and negative group velocities in the radio frequency (RF) regime were observed experimentally. RF band-gap structures have also been explored to mimic the photonic crystal (PC) device that has found many interesting applications such as wavelength specific filters, reflectors, waveguides, light trappers, and super-lenses. In one case, alternating 50Ω and 75Ω coaxial cable segments were connected in a row to create periodic impedance variations along the cable length to form the so called coaxial PC. Experimental evidence such as band-gaps, sub- or super-luminal velocities and defect modes were observed and investigated in the RF regime.

Recently, a coaxial cable sensor was demonstrated and investigated for health monitoring of concrete structures. The sensor was fabricated with tightly wrapped tin-plated steel spiral covered with solder. The cracks that developed within concrete structures could cause out of contact of the steel spirals. This topology change results in an impedance discontinuity that can be measured using time-domain reflectometry (TDR). The reported sensor has low resolution and works only for detection of extremely large loads, such as cracks, in the concrete. In addition, the method is prone to noise and random reflections generated during cable deployment and it does not have a deterministic relation between the signal and the applied load. Nevertheless, the work successfully proved the general feasibility of using coaxial cable sensor for SHM.

Additionally, in U.S. Pat. No. 7,421,910 to Chen et. al, another type of coaxial cable sensor is disclosed based on the electric time domain reflectometry (ETDR) and electric time domain transmission (ETDT) technologies. The sensor cable disclosed therein includes an inner conductor, a dielectric jacket, and an outer conductor that is configured to passively deform responsively to strain in an associated structure. The deformation translates strain into a measurable change in a reflection coefficient associated with the outer conductor. However, the deformation of the outer conductor or the dielectric jacket induced by the strain is limited, and the discontinuity only contributes limited changes to the local reflection coefficients. As a result, the ETDR or ETDT signal is relatively weak, which hinders the resolution as well as the least strain change of the strain sensing.

Therefore, there is a need to provide a new and improved coaxial Bragg grating cable with high resolution and capability of multiplex and remote operation.

SUMMARY

According to a first aspect, the invention provides a new and improved cable sensor based on the concept of coaxial cable Bragg grating (CCBG). The inventive cable sensor includes an outer conductor, an inner conductor, and a dielectric insulator sandwiched between the outer conductor and the inner conductor, whereas the outer conductor, the inner conductor, the insulator, or any combinations thereof, may have periodic impedance discontinuities along the length of the cable. The periodic impedance discontinuities may be generated by physical deformations and/or material alternations along the length of the cable.

According to another aspect, the invention provides a method for detecting environmental properties of a target environment using a coaxial cable sensing device. The method comprises, among other things, identifying one or more environmental properties of the target environment for detection and determining a calibration curve for the coaxial cable sensing device for each identified environmental property with respect to the target environment. The method further comprises positioning the coaxial cable sensing device in the target environment, with the coaxial cable sensing device having periodic impedance discontinuities along its length and then interrogating the coaxial cable sensing device to detect frequency changes of the coaxial cable sensing device. After interrogating the coaxial cable, the method additionally comprises measuring the frequency changes of the coaxial cable sensing device and analyzing the measured frequency changes against the one or more calibration curve.

According to another aspect, the invention provides an automated system for manufacturing a coaxial cable sensor having a plurality of impedance discontinuities periodically spaced along its length, with each adjacent discontinuity having the same predefined period distance between it and the next adjacent discontinuity. The coaxial cable sensor has an inner conductor, an insulating material disposed around the inner conductor, and an outer conductor disposed around the insulating material. In some embodiments, an outer covering is disposed around the outer conductor. The automated system comprises, among other things, a coaxial cable positioned on a platform by at least a first cable guide and a second cable guide, with the coaxial cable being introduced into the automated system by the first cable guide and a coaxial cable spooler for pulling the coaxial cable through the first cable guide and the second cable guide. The system further comprises a discontinuity creation device for creating periodic impedance discontinuities in the coaxial cable as the coaxial is pulled through the first cable guide and the second cable guide, with the discontinuity creation device positioned between the first cable guide and the second cable guide. The system also comprises an imaging device for acquiring an image of each created discontinuity, with the imaging device positioned between the discontinuity creation device and the second cable guide and at a predetermined distance from the discontinuity creation device. The system additionally comprises a computing device for determining the distance between two adjacent discontinuities created by the discontinuity creation device and synchronizing the rate of spin of the cable spooler. The computing device synchronizes the rate of spin of the cable spooler based on the determined distance between the two adjacent discontinuities and determined distance between the imaging device and the discontinuity creation device to move the coaxial cable a distance equal to the predefined period distance within an acceptable tolerance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 2A illustrates a cross-section of a CCBG sensing device according to various aspects described herein, FIG. 2B illustrates the reflection spectrum, and FIG. 2C illustrates the transmission spectrum.

FIG. 7D illustrates an exemplary CCBG sensor fabricated by hole-drilling method according to various aspects described herein and FIG. 7E illustrates an exemplary hole-drilling setup according to various aspects described herein.

Corresponding reference characters indicate corresponding parts throughout the drawings.

DETAILED DESCRIPTION

Figure 1A:
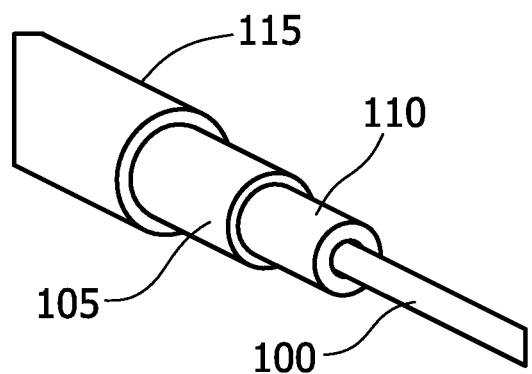
FIG. 1A illustrates a conventional coaxial cable and FIG. 1B illustrates a conventional fiber cable.
Figure 1B:
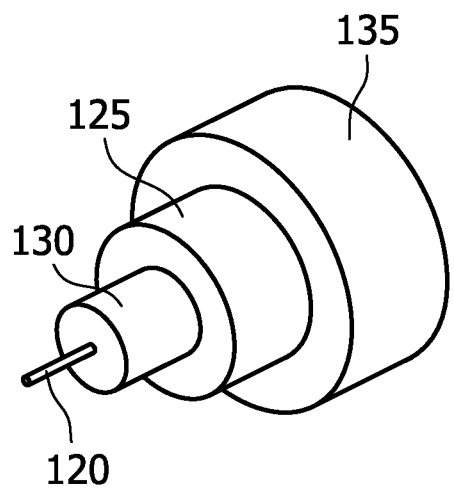
Figure 2A:
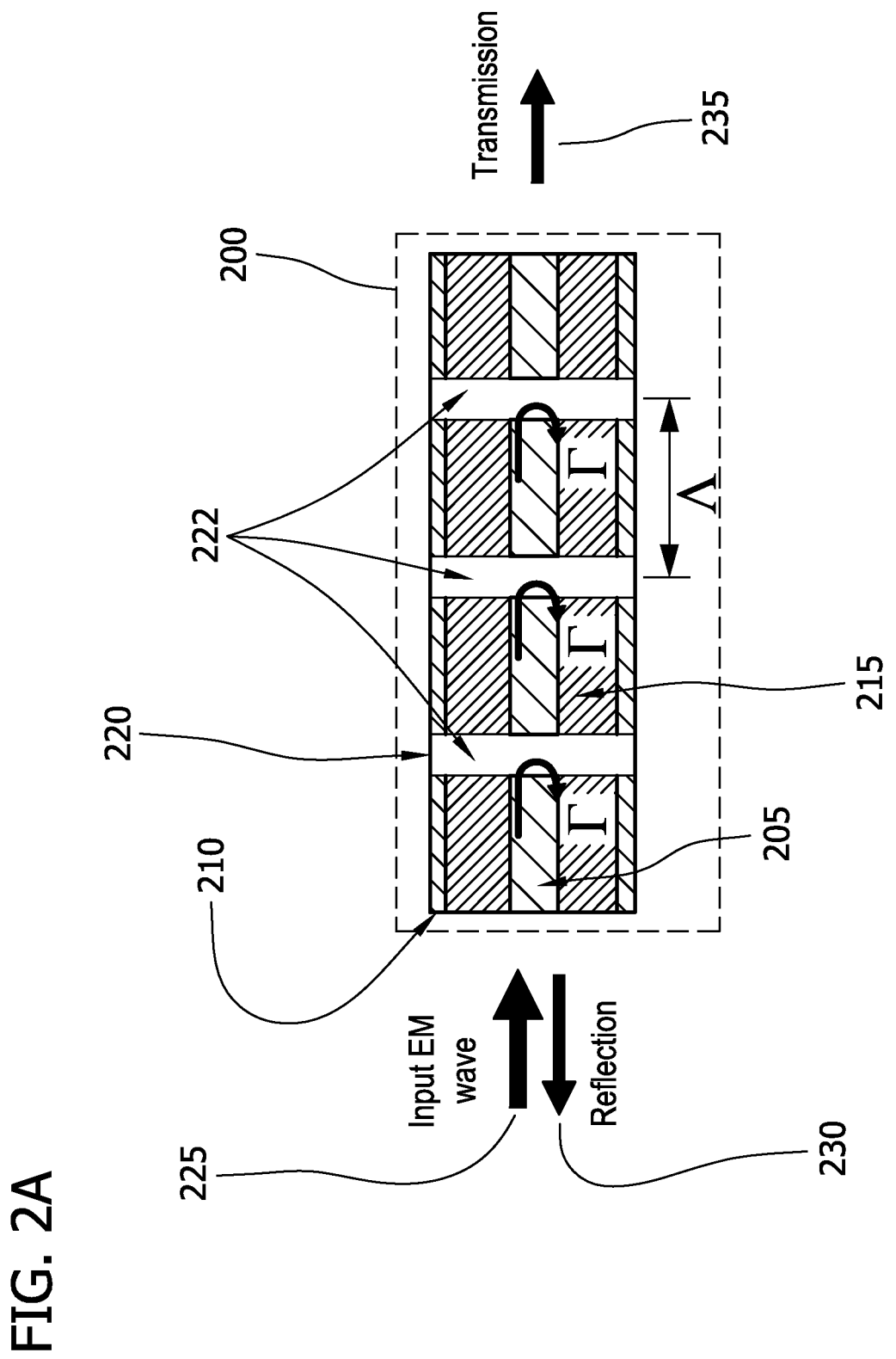
FIGS. 2A-2C illustrate the operational principle of a CCBG sensing device.

FIG. 1A and FIG. 1B illustrate the two basic waveguide cables—a conventional coaxial cable and a conventional optical fiber cable. FIG. 1A illustrates a conventional coaxial cable, which consists of an inner conductor 100 and an outer conductor 105 with a tubular insulating layer 110 disposed around the inner conductor and between the inner conductor 100 and the outer conductor 105. The insulating layer 110 is typically made of a flexible material with a relatively high dielectric constant. A plastic jacket 115 generally runs the length of the cable and covers the outer conductor 105. FIG. 1B illustrates an optical fiber, which consists of a core 120 and a buffer 125 with a cladding 130 sandwiched therebetween. A jacket 135 generally runs the length of the cable and covers the buffer 125. As noted above, these two types of cables share common fundamental physics governed by the same electromagnetic (EM) theory, except that the frequencies of the EM waves supported by the two are quite different. In comparison with optical fibers, coaxial cables can survive large longitudinal strain and are relatively resistant to lateral force and bending Aspects of the invention involve an improved coaxial cable sensor based on the concept of coaxial cable Bragg grating (CCBG). The inventive coaxial cable sensor introduces impedance discontinuities in a coaxial cable spaced periodically along a length of the cable sensor, as demonstrated in FIG. 2A. FIG. 2A illustrates one embodiment of a coaxial cable sensor 200. Cable sensor 200 includes, among other things, an inner conductor 205 and an outer conductor 210, with a dielectric insulator 215 sandwiched therebetween, and an outer covering 220. The cable sensor 200 additionally includes periodic discontinuities 222 along the length of the cable sensor 200. In some embodiments, the discontinuities occur in the outer conductor 210, while in other embodiments, the discontinuties occur in the inner conductor 205. In yet another embodiment, the discontinuities occur in both the inner conductor 205 and the outer conductor 210.

Referring still to FIG. 2A, the periodic discontinuities along the length of the sensor cable generates a weak reflection to the EM wave 225 propagating inside the cable. Assuming all the d~iscontinuities are substantially the same, the overall reflection 230 can be obtained based on the well-established transmission line theory, $$\text{reflection spectrum} = \frac{\Gamma e^{-j2\beta\Lambda}\{1-[(1+\Gamma)^2 e^{-j2\beta\Lambda}]^N\}}{1-(1+\Gamma)^2 e^{-j2\beta\Lambda}} \quad (1)$$

where N is the number of discontinuities in the cable; $\beta$ is the propagation constant of the EM wave travelling inside the cable; $\Lambda$ is the period of the grating; and, $\Gamma$ is the reflection coefficient of each individual discontinuity. Equation (1) indicates that the accumulation of the individual reflections eventually results in strong reflections at discrete frequencies where the superposition is in-phase (i.e., $\beta\Lambda$ is the integer multiple of $\pi$).

Figure 2B:
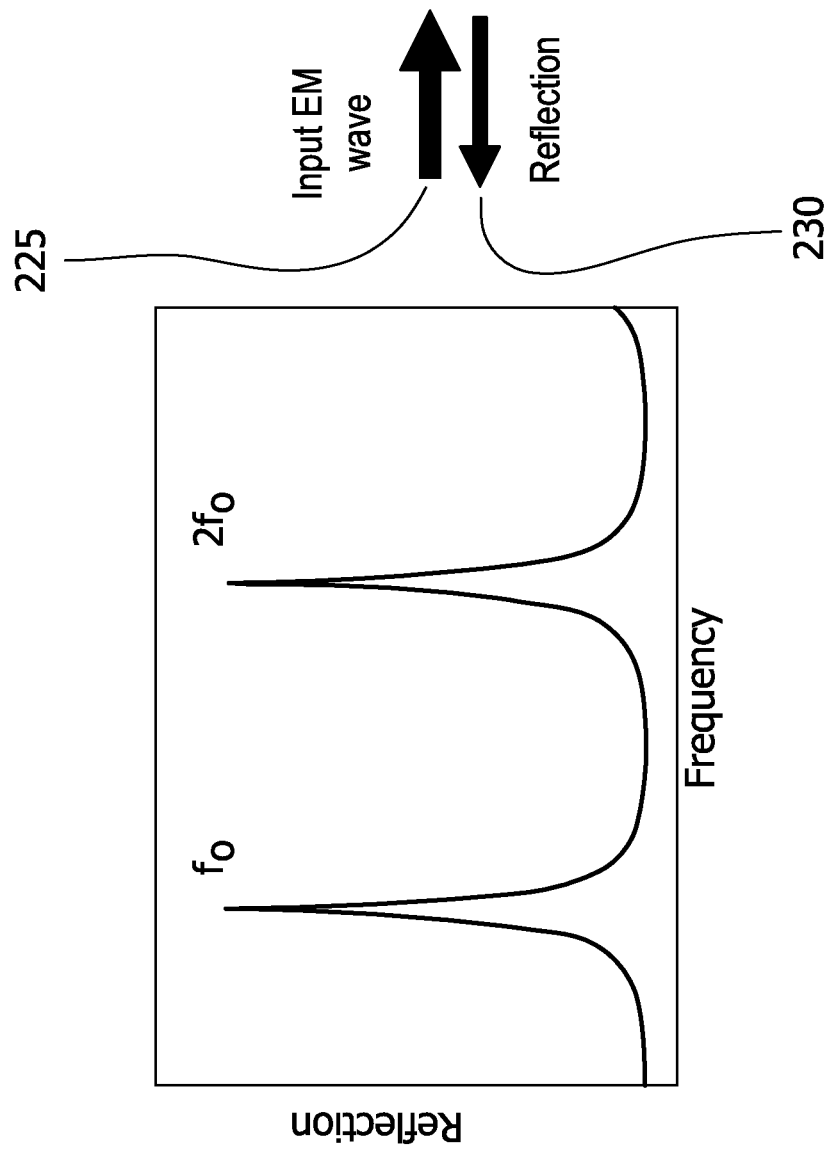
Figure 2C:
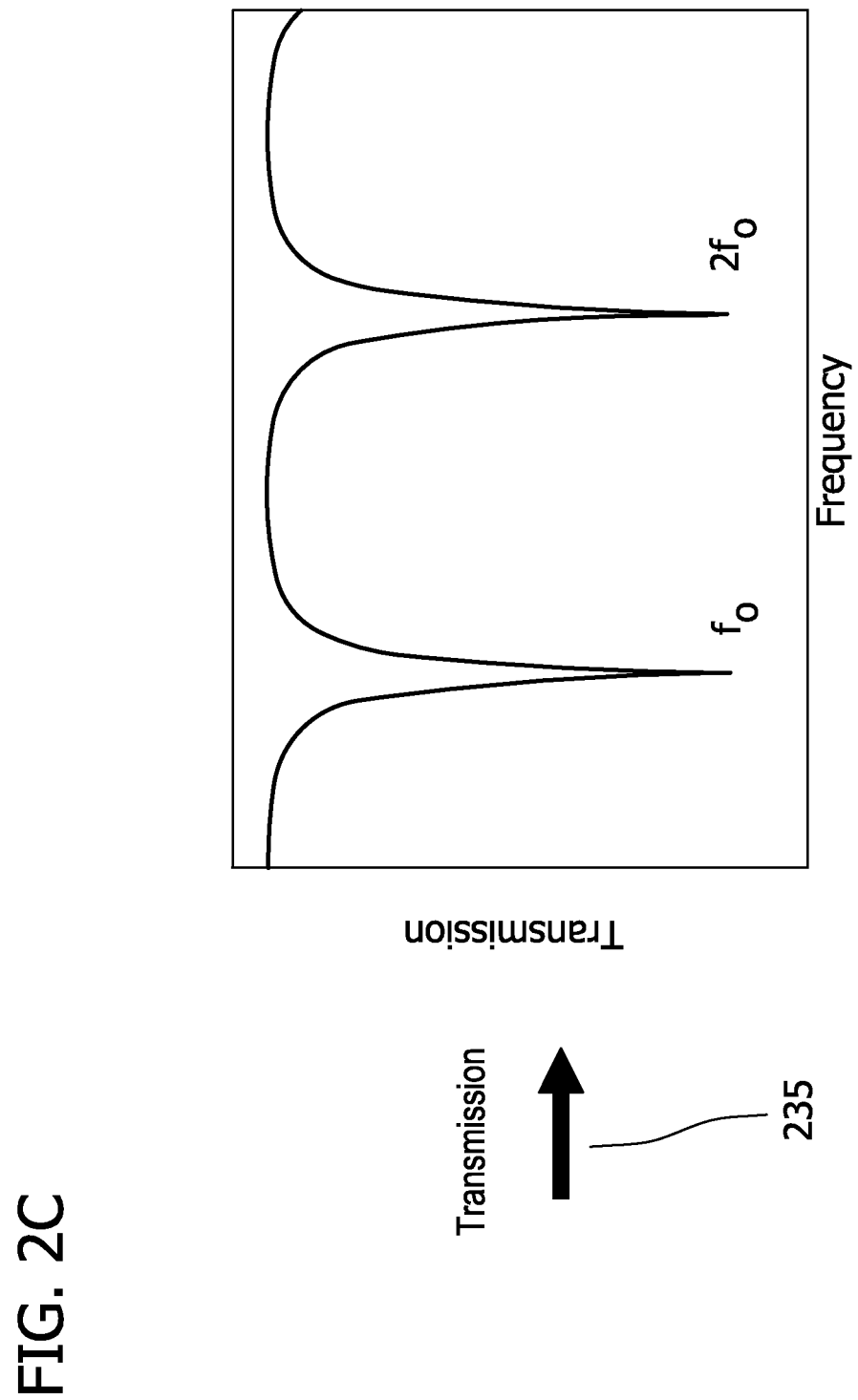

FIG. 2B illustrates a typical reflection spectrum based on the conceptual approximation of Equation (1). An equation can also be derived for the overall transmission spectrum, which has resonant valleys corresponding to the resonant peaks in the reflection spectrum as illustrated in FIG. 2C. The resonant frequencies of the reflection and transmission spectra of the CCBG cable are a function of the period of the grating, e.g. the discontinuities. Applying strain on the CCBG cable changes the grating period and thus shifts the resonant frequencies. The sensor cable 200 (or "sensor device") can be interrogated by sending an EM wave 225 from one end of the cable 200 and analyzing either the reflection 230 spectrum (for example, from an input port of a device connected to cable 200 through a splitter or circulator) or the transmission 235 spectrum (from the opposite end of the input port)

To further understand the inventive CCBG device, two modeling approaches are utilized: the electrical transmission line theory and the optical coupled-mode theory. Because CCBG cable is an electrical device inspired by an optical concept, modeling based on both electrical and optical approaches provides a better understanding of the physical insights to guide the device design and fabrication.

The transmission line (TL) approach is widely used for coaxial cable modeling. Although the transmission line theory based Equation (1) is conceptually illustrative, it is generally not suitable for device design because the reflection coefficient $\Gamma$ is not known. Due to the complex discontinuity structures, an analytical model of $\Gamma$ as a function of the discontinuity geometry is difficult to obtain and a numerical EM simulation using a full-wave simulator has to be performed. In order to simplify CCBG modeling and simulation, aspects of the present invention utilize a novel segmentation approach.

Figure 3:
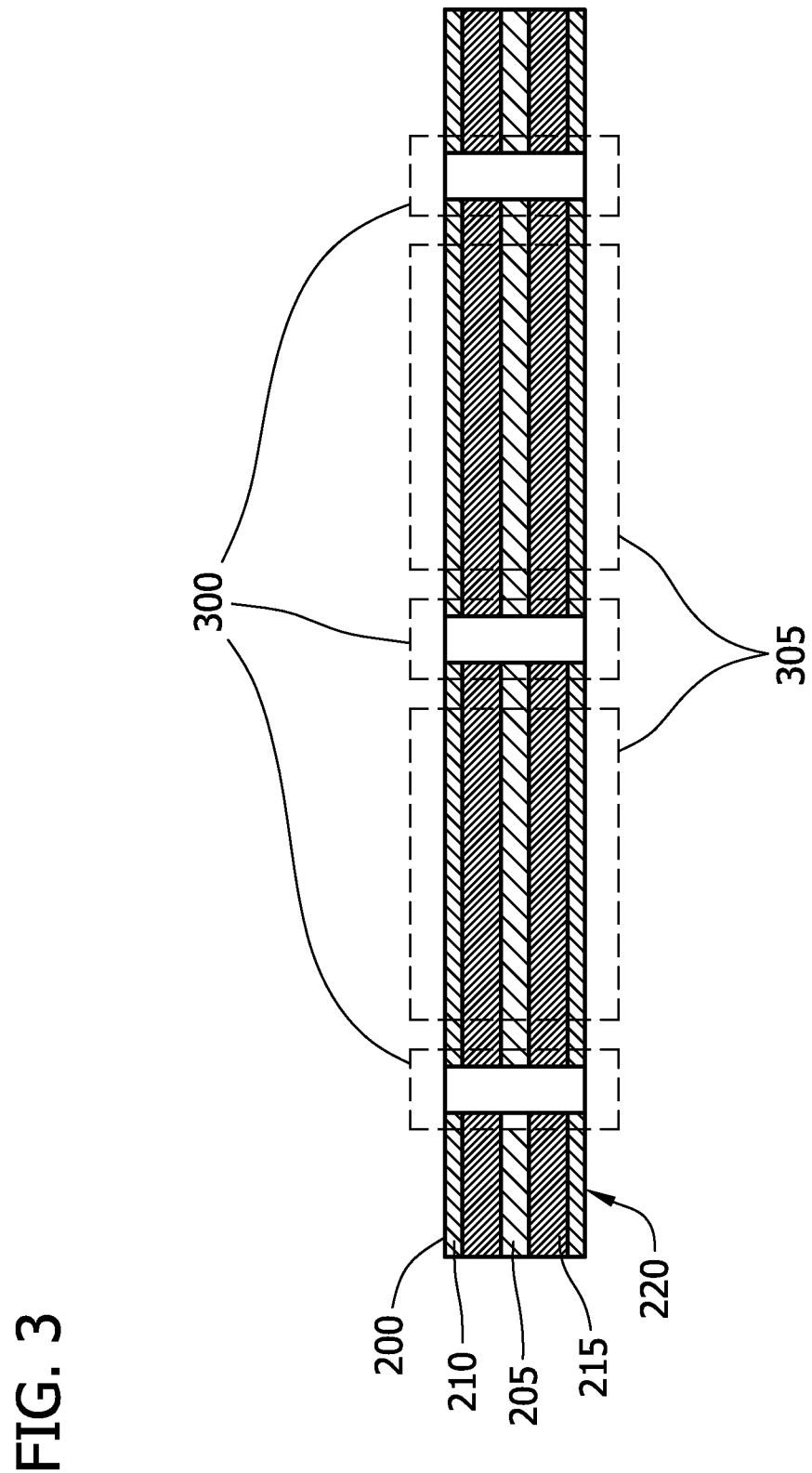
FIG. 3 illustrates the segmentation approach for CCDG modeling according to various aspects described herein.

As illustrated in FIG. 3, the entire cable 200 is divided into multiple discontinuity segments 300 and transmission-line segments 305. Each discontinuity segment 300 is investigated using a full-wave numerical solver to compute its network parameters, for example the S-parameters. In a full-wave analysis, the Maxwell's equations for the electromagnetic fields are solved without any simplifying assumptions about the nature of the EM problem. However, because the length of the discontinuity segment is relatively short, its simulation can still be fast and efficient. Each intact segment 305 between two adjacent discontinuities 300 is modeled as a transmission line, which supports only the transverse EM (TEM) waves and makes the simulation much faster compared to a full-wave analysis. The overall performance of the device can then be obtained by cascading the network parameters associated with all the segments 300 and 305. Combining the strengths of the rigorous full-wave solution for the discontinuities 300 and the fast transmission-line solution for the remaining cable 305, the proposed segmentation approach accurately models and simulates the CCBG device in a time-efficient fashion.

The coupled-mode theory (CMT) based approach is a well proven and effective approach for modeling optical fiber gratings and couplers. CMT is a mathematical tool that computes the energy coupling between two EM modes propagating through a perturbed waveguide (e.g., the periodic refractive index changes in an FBG). Compared to other methods, CMT-based approach directly correlates a geometrical and/or material discontinuity with the energy coupling between two modes. The results may thus be directly used to guide the device design and fabrication.

Inside the coaxial cable, the forward and backward propagating waves, T(z) and R(z), can be viewed as two EM modes with their propagation constants of the same value but opposite signs (i.e., $\beta^T = -\beta^R = \beta$). These two EM modes are orthogonal in an intact coaxial cable and hence, do not exchange energy. The presence of the periodic discontinuities of the CCBG structure causes the energy carried by the transmission mode T to be coupled into the reflection mode R, resulting in resonances at specific frequencies. Energy coupling between these two modes can be expressed by the following coupled differential equations:

$$\frac{\partial R(z)}{\partial z} = j\kappa_{RR}R(z) + j\kappa_{RT}T(z)\exp(j2\beta z) \quad (2)$$

and $$\frac{\partial T(z)}{\partial z} = -j\kappa_{TR}R(z)\exp(-j2\beta z) - j\kappa_{TT}T(z),$$

where $\kappa_{RR}$ and $\kappa_{TT}$ are the self-coupling coefficients; $\kappa_{RT}$ and $\kappa_{TR}$ are the cross-coupling coefficients. Because the two modes are essentially the same EM wave except that their propagation directions are opposite, these coupling coefficients are essentially the same and determined by the relative complex permittivity variation in the periodic discontinuities, given by:

$$\kappa_{RR} = \kappa_{TT} = \kappa_{RT} = \kappa_{TR} = \frac{1}{4}\int_{\infty}\int \Delta\varepsilon(x, y, z)dxdy, \quad (3)$$

where $\Delta\varepsilon(x,y,z)$ is the relative effective permittivity change at the discontinuity region, which can be derived as a function of the structural/material changes of the coaxial cable based on the effective medium approximation (EMA) theory. EMA has been successfully applied to the studies of the effective conductivity, dielectric functions, and elastic modules of randomly mixed composites. The most commonly used EMA models include the Maxwell-Garnett model, the Landauer-Bruggeman model, the Stroud model, and the Chylek model. When the perturbation (i.e., the changes in structure, material, and geometry) is small, these models agree well with each other.

As noted above, the CCBG sensor includes periodic discontinuities along the length of the cable. In some embodiments, the periodic disconinuities are structural in nature, such as physical deformations. In other embodiments, the periodic discontinuities are material in nature, such as material alterations in the inner conductor 205, the outer conductor 210, the insulator 215, or any combinations thereof. Furthermore, the physical deformations may be in the form of demensional changes along the length of the cable 200, while the material alterations may be the periodic replacement of at least a portion of the conductor material 205 or 210, or the insulator material 215 by air or other materials.

Figure 4A:
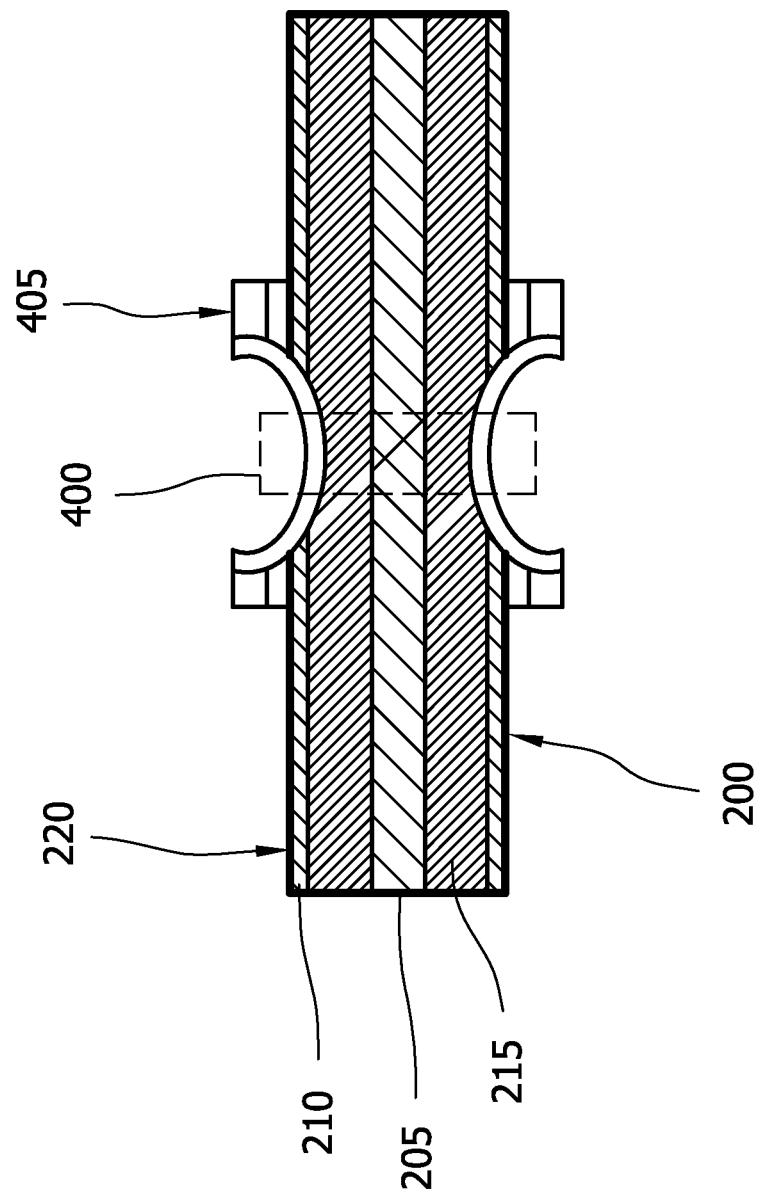
FIG. 4A illustrates an exemplary CCBG sensing device in cross-section with periodic physical deformations according to various aspects described herein.
Figure 4B:
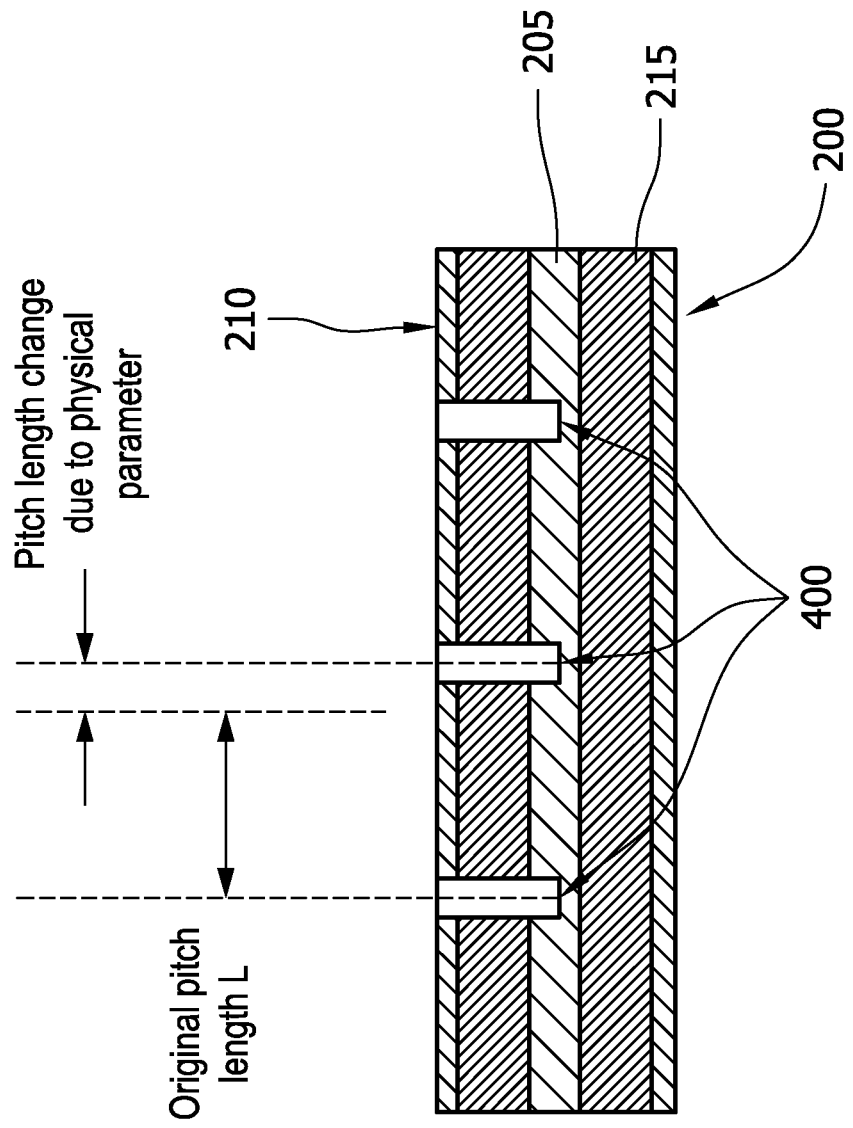
FIG. 4B illustrates an exemplary CCBG sensing device in cross-section with periodic material alterations by air according to various aspects described herein.

Referring now to FIGS. 4A and 4B, each figure illustrates an exemplary embodiment of the inventive cable/sensor. In FIG. 4A, a cross-section of the exemplary sensor is illustrated with a periodic physical deformation 400, i.e., a periodic waist reduction along the outer covering 220 and the outer conductor 210. In some embodiments, the waist reduction 400 is generated by compressing a metal sleeve 405 onto the coaxial cable 200 using a crimping tool. FIG. 4B illustrates another exemplary sensor 200 with periodic material alterations 400 of periodic holes drilled through its outer conductor 210 and insulator 215 (with an outer covering not shown in this example). In this embodiment, the outer conductor 210 and insulator 215 materials in the hole are replaced by air. An exemplary process for creating these periodic holes is more fully described below.

Figure 5:
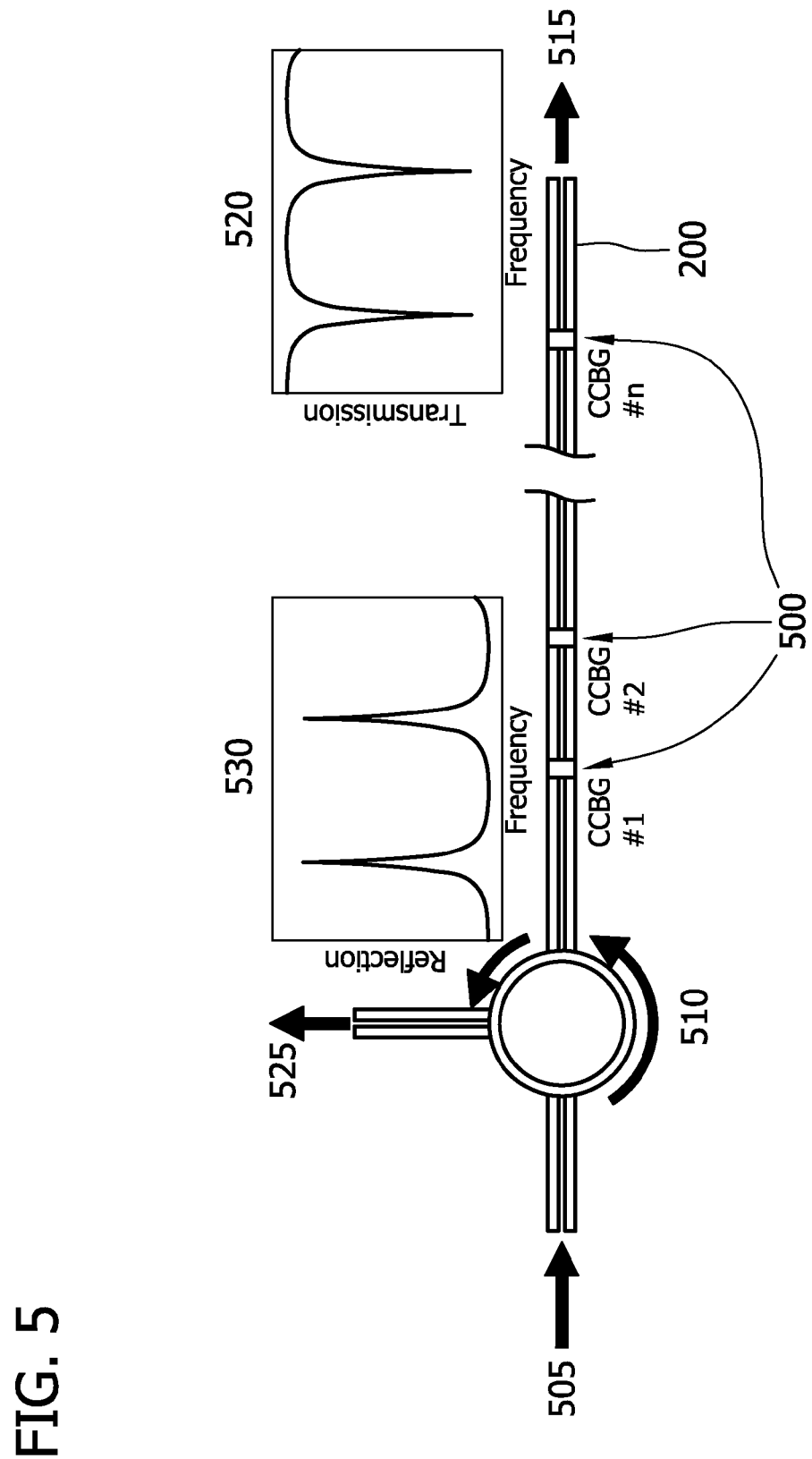
FIG. 5 illustrates the transmission and reflection interrogation of exemplary multiplexed CCBG sensing devices according to various aspects described herein.

FIG. 5 illustrates another embodiment of the present invention. In the illustrated embodiment, a number of CCBG sensors 500 with different fundamental resonant frequencies are connected in series using a single coaxial cable 200 to share the same interrogation unit (not illustrated). In FIG. 5, the multiplexed CCBG sensors 500 are interrogated in either the transmission or reflection mode. In the transmission mode, a source 505 sends a frequency-swept signal through a circulator/splitter 510 to the cascaded CCBG sensors 500 from one end of the coaxial cable 200. A detector (not shown) detects an output power 515 at a specific frequency at the other end of the cable 200, which is then used to construct the transmission spectrum 520. In the reflection mode, the source and detector are on the same end of the cable, where the detector (not shown) detects a reflection output 525 via the circulator/splitter 510, which is then used to construct a reflection spectrum 530.

Other embodiments of the present invention provide multiple methods for fabricating the CCBG sensor 200 with periodic discontinuities 222 along the cable. The fabrication methods include a hole-drilling method and a controlled-deformation method, both of which can be performed manually or performed in an automated fashion.

According to an embodiment of the present invention, a CCBG device, such as coaxial cable 200 with periodic discontinuities 222, is fabricated using a drill-bit to drill holes on the coaxial cable 200 to create the periodic discontinuities 222. While the drilling process can be performed manually, the depth, size, shape, surface quality, and orientation of these holes are hard to manage using a manual process. Furthermore, the spatial separation of these holes is also not precisely controlled when using a manual process.

Some embodiments of the present invention therefore utilize a laser-based hole-drilling method to fabricate high-quality CCBG devices. The power of the laser beam can be varied precisely to control the amount of materials to be removed, i.e., drilled. The spot size of the laser beam can also be focused very small. As such, laser micromachining results in high dimensional precision and good surface quality. Laser micromachining permits the drilling of holes having arbitrary shapes and orientations. For example, one may use two types of lasers for CCBG fabrication, including the $CO_2$ laser at the wavelength of 10.6 μm and the femtosecond (fs) Ti-Sapphire laser at the wavelength of 800 nm. Advantageously, two lasers can be used to drill holes with better resolution and accuracy.

While hole-drilling on a coaxial cable may potentially degrade the mechanical strength of the cable, a hole-based CCBG permits measurements of other parameters such as corrosion and chemical concentration. For example, a hole-based CCBG allows moisture to enter the discontinuity created by the hole. In this example, the moisture causes the outer conductor and/or the inner conductor to corrode, which in turn affects the transmission and reflection properties of the conductor. A hole-based CCBG also provides opportunities for filling the holes with various types of materials for the purpose of temperature compensation.

Other embodiments of the present invention utilize a controlled-deformation method. The controlled-deformation method involves introducing periodic, controlled deformations to at least the outer conductor 210 of the cable 200. For example, FIG. 4A demonstrates using a deformed metal sleeve 405 to create a discontinuity in the area of deformation 400. The periodic deformation discontinuities 400 created on a coaxial cable 200 by these controlled deformations disrupt an EM wave propagating inside the cable 200, which in turn generates a reflection inside the cable 200.

Figure 6:
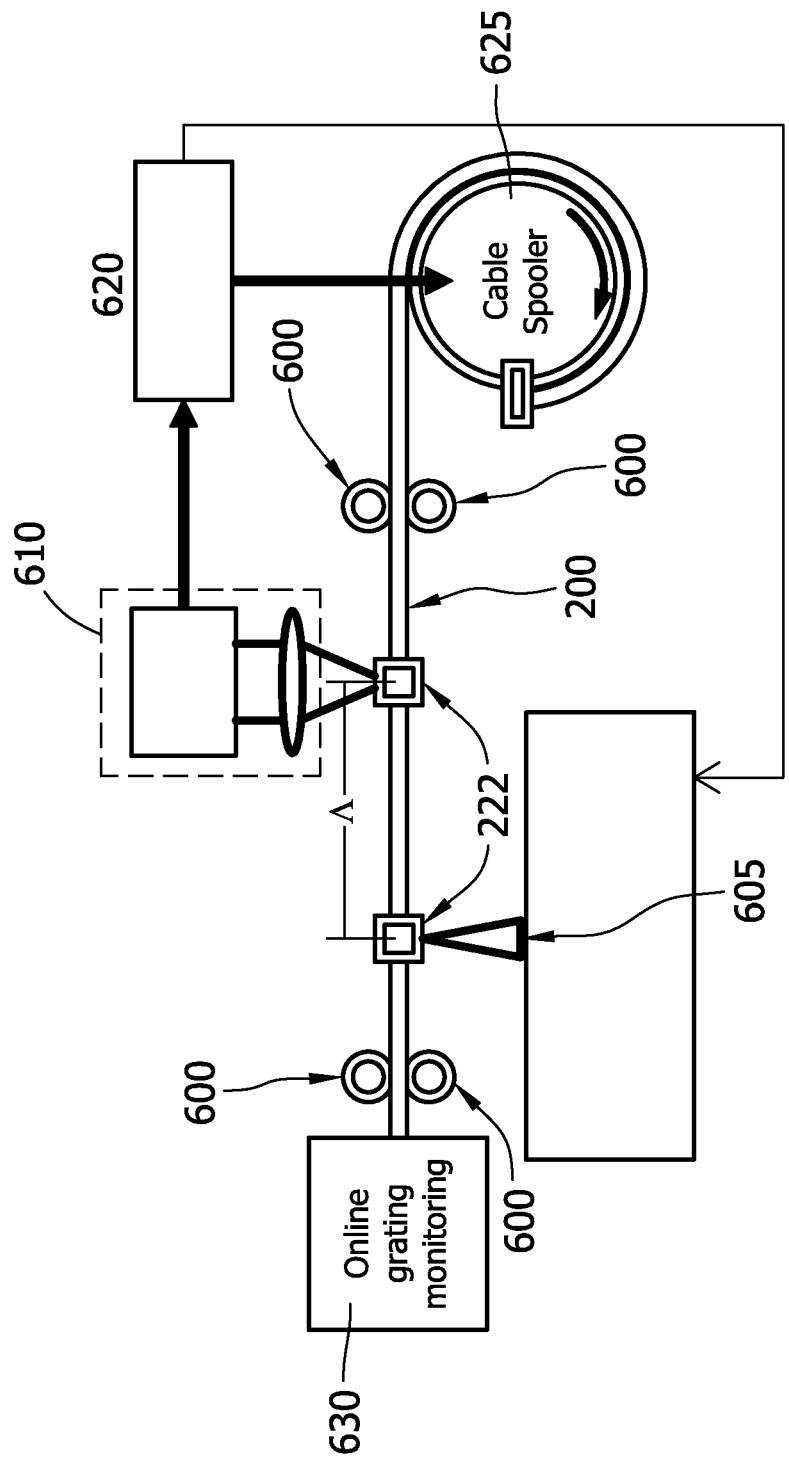
FIG. 6 illustrates a block diagram of the automated CCBG manufacturing system according to various aspects described herein.

FIG. 6 illustrates an embodiment of an automated manufacturing system for fabricating high-quality CCBG sensors by reducing manufacturing tolerances. As shown in FIG. 6, the illustrated system positions the coaxial cable 200 on a platform by a number of cable guiding/positioning clamps 600. In some embodiments, the clamps 600 are double-sided and spring-driven to exert a constant force on the cable 200. The discontinuity creation system 605 creates discontinuities using either of the two methods discussed above. A CCD imaging system 610 acquires the microscopic image of the discontinuity and calculates the dimensions of the discontinuity to confirm the quality. In some embodiments, a computer 620 connected to the CCD imaging system 610 calculates the dimensions.

The position of the CCD camera 610 with respect to the discontinuity creation system 605 is calibrated so that the distance between the two adjacent discontinuities 222 can be accurately measured. In some embodiments, the computer 620 uses the calibrated distance to control the rate of spin of a cable spooler 625 to move the cable 200 a distance equal to the period of the grating, within an acceptable tolerance. By repeating the procedure, a CCBG can be fabricated with desired precision. A grating monitoring system 630 can be connected to the free end of the cable for on-line monitoring of the CCBG quality. In some embodiments, the computer 620 utilizes both the CCD camera 610 and the grating monitoring system 630 to control the rate of spin of the cable spooler 625

Aspects of the invention further provide several methods of employing the CCBG sensor to measure and/or monitor environmental properties of a target environment, such as (but not limited to) temperature, pressure, strain, and/or acoustic waves. In one embodiment, a method of measuring and/or monitoring includes the steps of 1) placing the CCBG sensor with periodic impedance discontinuities along the length of its cable in a target environment, 2) measuring the frequency changes of the sensor, 3) analyzing the frequency changes against a predetermined calibration curve for each environmental property being measure or monitored. The calibration curve described herein is predetermined based on the placement of the sensor in the target environment. Therefore, in some embodiments, each predetermined calibration curve for each environmental property includes baseline information for the coaxial cable with respect to the environmental property. According to aspects of the present invention, the CCBG sensor is placed in a target environment by placing, affixing or otherwise attaching the sensor to a surface of a structure in the target environment (e.g., by epoxy or glue). In other embodiments, the sensor is embedded within a structure in the target environment. Regardless of its placement, the sensor can be installed in either a linear or a curvilinear manner or both, e.g., a first portion of the sensor is installed linearly along a wall, while a second portion of the sensor is installed with a bend in it to pass over a door. Since the predetermined calibration curve is predetermined based on the sensor placement in the target environment, the physical orientation of the sensor does not affect the analysis.

Figure 7A:
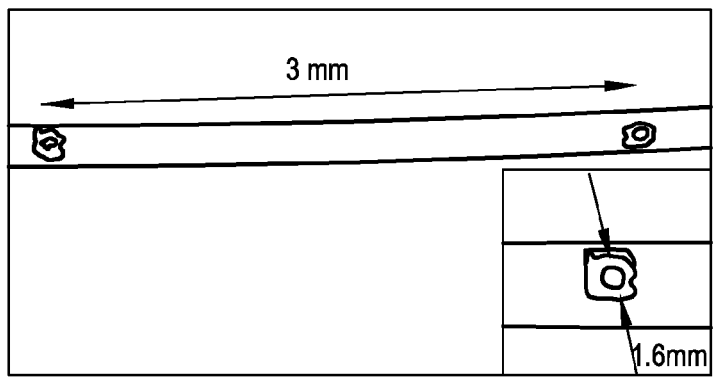
FIG. 7A illustrates the transmission spectrum of an exemplary CCBG sensor fabricated by a hole-drilling method according to various aspects described herein.
Figure 7B:
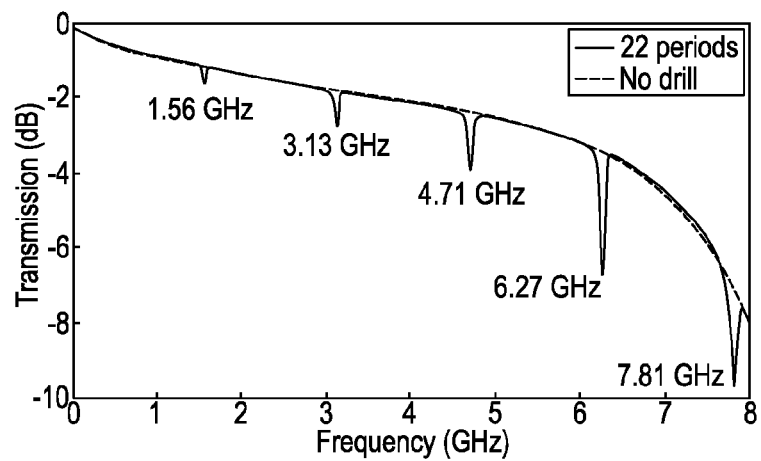
FIG. 7B illustrates the reflection spectrum and FIG. 7C illustrates the fundamental resonant frequency as a function of laoded strain.
Figure 7C:
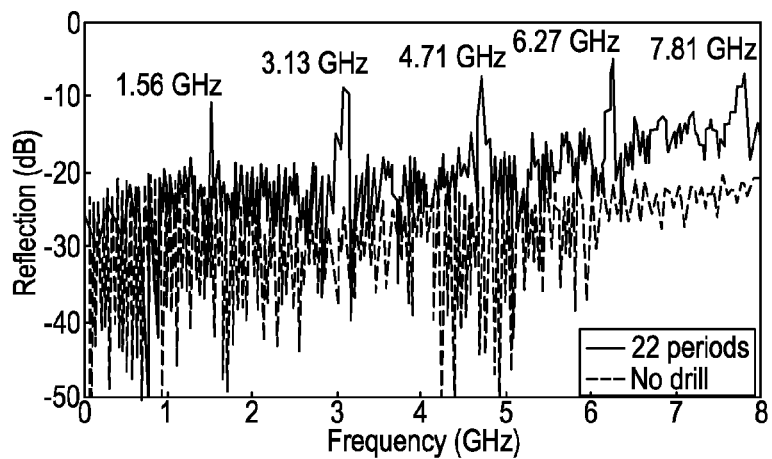

FIG. 7A demonstrates an exemplary CCBG sensor with periodic continuities along the outer conductor of the cable was fabricated to monitor and measure strain introduced along the length of the cable. The exemplary CCBG sensor was fabricated by drilling 23 holes of equal-distance into a coaxial cable (RG-58 provided by Mini-Circuits). The holes had a diameter of 1.6 mm and an equal spacing of 3 cm, as shown in FIG. 7A. The depth of the holes was manually controlled. The signal interrogation of the CCBG sensor was conducted using a Vector Network Analyzer (VNA), where the reflection and transmission spectra of the CCBG were recorded. The reflection and transmission spectra of the CCBG (in red) are shown in FIGS. 7B and 7C where the spectra of a coaxial cable (in blue) of the same type but without periodic hole-drilling are also plotted for reference. Resonant peaks of the CCBG can be clearly identified with good signal-to-noise ratio (SNR) while the unmodified cable only shows the frequency-dependent loss. The fundamental resonant frequency ($f_0$) was at 1.56 GHz. A number of higher-order resonant frequencies are also observed at the integer multiples of $f_0$. It is also worth noting that the hole-drilling did not increase the background loss as evidenced by the fact that the red and blue curves are well-overlapped except at the resonant frequencies.

Figure 7D:
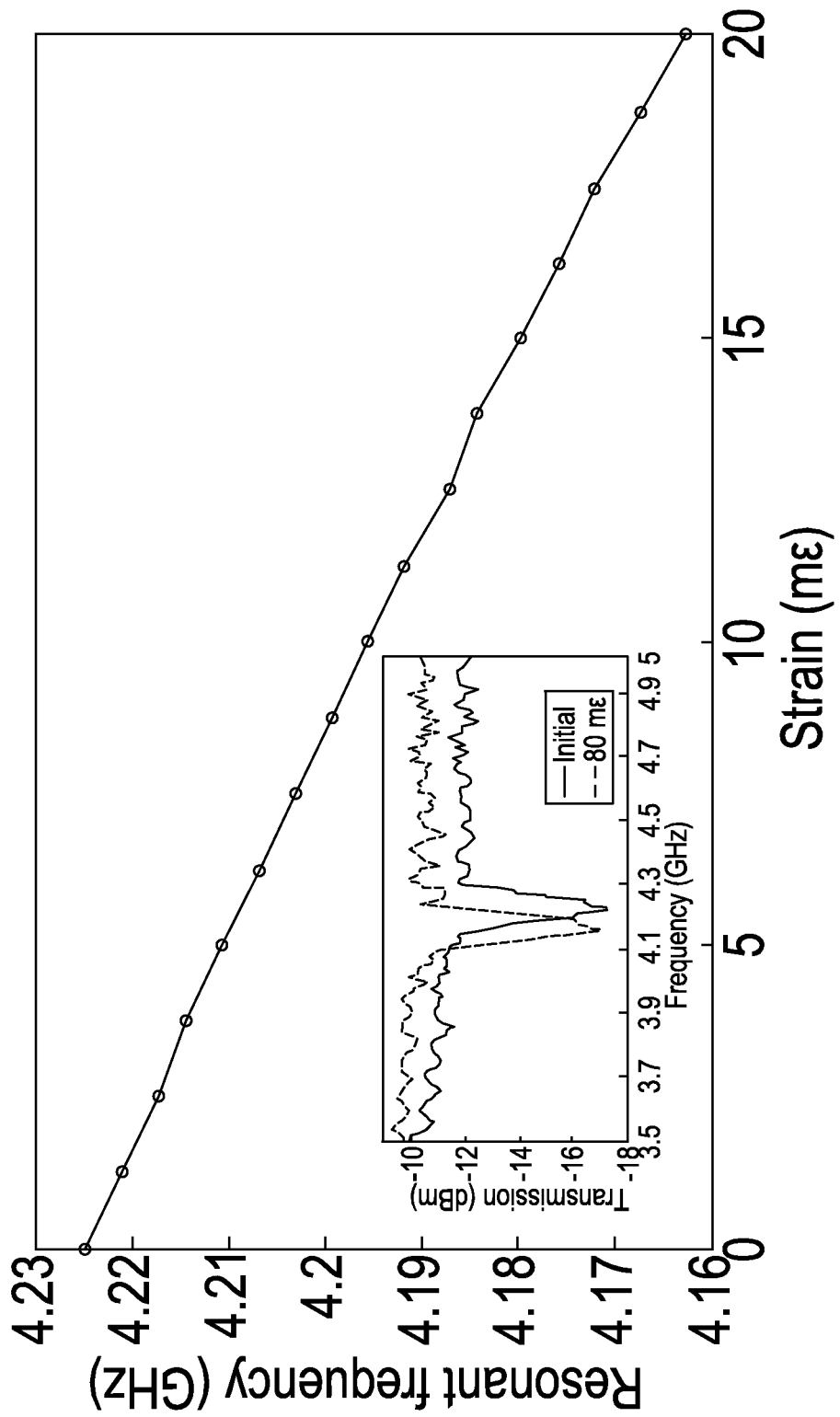

The cable was mounted on a load cell using two machined aluminum clampers at the two ends. The applied tensile strain on the CCBG was increased from 0 to 20 m$\in$ (or 2%) at a step of 1.25 m$\in$. At each step, the transmission and reflection spectra of the device were recorded to find the resonant frequencies. FIG. 7D shows $f_0$ as a function of the applied strain, where $f_0$ decreased linearly at a slope of 3 kHz/$\mu\in$ as the applied strain increased all the way up to 2%.

In real-world applications, the temperature-strain cross-sensitivity of a CCBG sensor is particularly problematic because the ambient temperature change is unpredictable. Temperature sensitivity for different types of coaxial cable is drastically different, as different coaxial cables have differing dielectric material properties, differing physical structures for the outer conductor, and differing method of cable assembly. All these factors, including certain ambient temperature variations, lead to an overall cable sensing performance variation.

Two illustrative examples explain the thermal impact of these factors. Solid and foam polyethylene designs are commonly used as insulation dielectric material for coaxial cable. However, the thermal expansion capability for solid polyethylene is much weaker than the foam polyethylene, which determines the effective dielectric constant change rate difference between two materials. Another example deals with the outer conductor structure. In flexible coaxial cable, the outer conductor is made of copper braid, which easily becomes loose as dielectric material expands. Semi-rigid coaxial cable, however, has a solid copper shielding layer. The radial expansion room for the flexible design is apparently greater than that for the semi-rigid design. Advantageously, a CCBG sensor made from semi-rigid coaxial cable is expected to perform less sensitively under different ambient temperatures.

Figure 8:
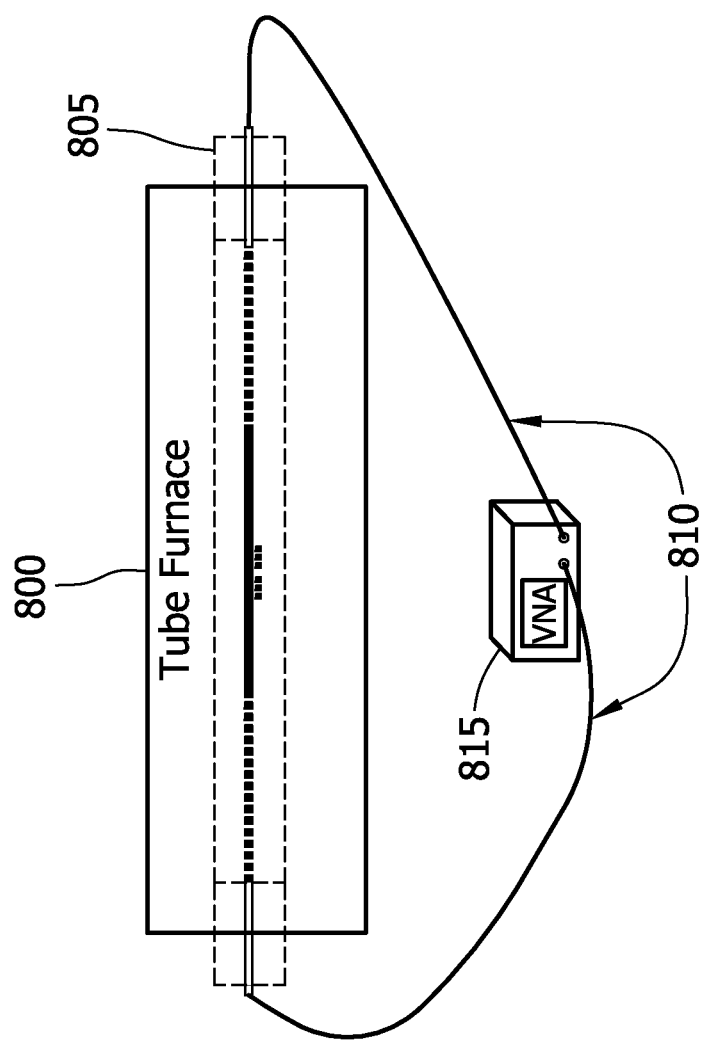
FIG. 8 illustrates an exemplary CCBG sensor setup for temperature sensitivity testing according to various aspects described herein.
Figure 9A:
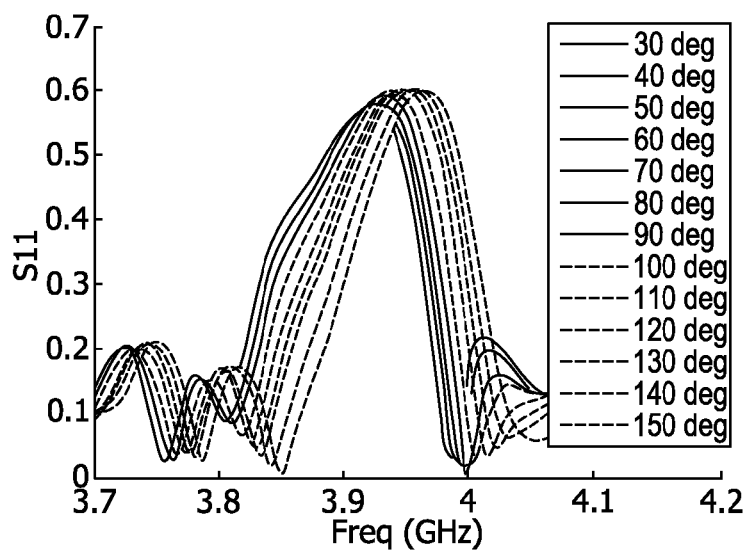
FIG. 9A illustrates the reflection spectra of an exemplary flexible CCBG sensing device at elevated temperatures according to various aspects described herein and FIG. 9B illustrates the reflection spectra of an exemplary semi-rigid CCBG sensing device at elevated temperatures according to various aspects described herein.
Figure 9B:
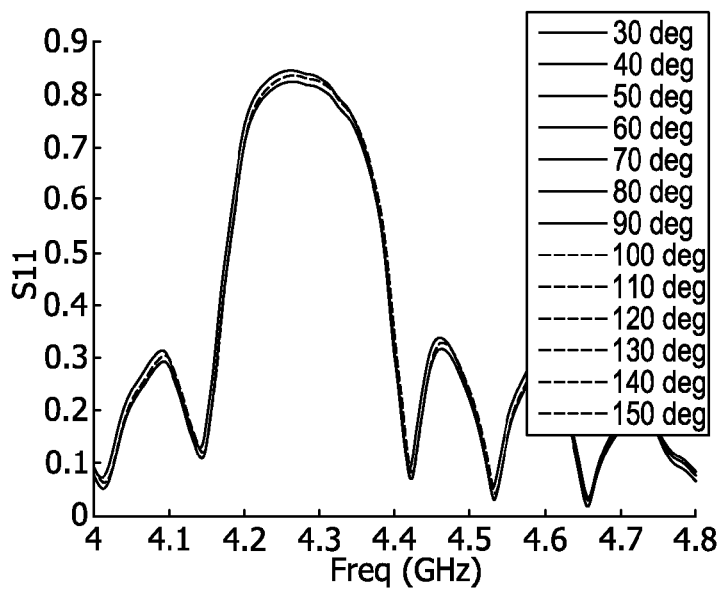

In order to quantify the temperature sensitivity of a CCBG sensor, the frequency domain responses (i.e. reflection spectrum and transmission spectrum) are measured using a VNA at various operation temperatures. FIGS. 8 and 9A-9B demonstrate the testing of two CCBG sensor samples for temperature sensitivity. One sensor is made from a 50$\Omega$ flexible coaxial cable, while the other is made from a 50$\Omega$ semi-rigid coaxial cable. The flexible sensor is 70" long and it has 52 holes with the hole-hole separation of 2.5 cm. The semi-rigid coaxial cable is 60" long with 34 holes but keeping the same hole-hole separation. FIG. 8 illustrates an experimental setup using a tube furnace 800. A CCBG sample 805, e.g., a coaxial cable 200 with periodic discontinuities, is placed in a Lindberg Blue tube furnace 805 and two extension coaxial cables 810 are used to connect the samples to the VNA 815. In these tests, the ambient temperature is well controlled, varying from 30° C. to 220° C. The reflection and transmission signals at the fundamental resonance frequency are sampled and recorded every 10° C. by the VNA 815.

Figure 10:
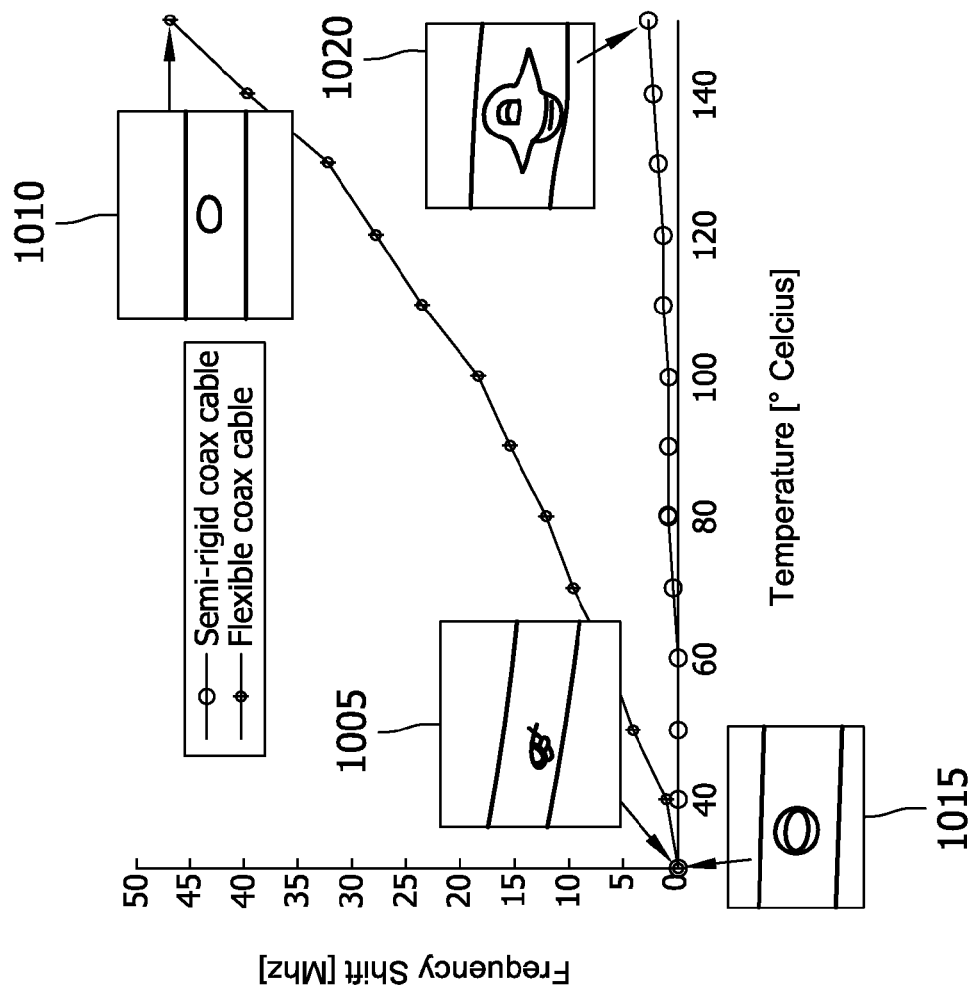
FIG. 10 illustrates a resonant frequency shift as a function of temperature of an exemplary CCBG sensing device fabricated on both flexible and semi-rigid cable according to various aspects described herein.

FIGS. 9A and 9B illustrate the results of the described test, which shows the reflection spectrums S11 at different temperatures for the two CCBG samples. FIG. 10 illustrates the flexible coaxial cable with two hole-based discontinuities 1005 and 1010, and the semi-rigid coaxial cable with two hole-based discontinuities 1015 and 1020. As further illustrated by FIG. 10, the resonance frequency increases as the temperature rises for the flexible cable sample, since the air bubble in its dielectric insulation grows bigger as the dielectric material is heated and copper braid shielding readily expand outwards. Consequently, the effective dielectric constant of the cable decreases and the resonance frequency increases correspondingly. As temperature rises up to 200° C., the dielectric material in the flexible cable melts and redistributes along the entire cable. Thus, the resonance frequency change is no longer obvious and instead the reflection spectrum magnitude decreases significantly.

On the other hand, the semi-rigid cable performs much better than the flexible cable. The resonance frequency does not have a visible change even up to 200° C., so the cross correlation algorithm is used to capture these tiny frequency shifts. The relative frequency deviations at different temperatures with regard to the reference case, (i.e. 30° C. case), are calculated. Under 50° C., the resonance frequency does not shift as temperature varies. At 100° C., it shifts about 0.5 MHz and the shift increases to 4 MHz at 200° C. Experiments also show the semi-rigid cable has a severe frequency shift above 300° C., which is drastically greater than the ambient temperature for practical infrastructure strain sensing environment.

Conclusively, CCBG sensor expands as a function of temperature increase, resulting in a shift of the resonant peaks/valleys towards higher frequency. However, it is possible to fill the drilled holes with a type of material that increases its permittivity as temperature increases. As a result, a temperature insensitive device design may be achieved by balancing the temperature dependent geometry expansion and the thermal-electrical effect.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

While the invention has been described in connection with specific embodiments thereof, it will be understood that the inventive device is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

What is claimed is:

1. A coaxial cable Bragg grating sensing device configured for use in a frequency domain transmission or frequency domain reflection to detect and measure at least one of strain, temperature, pressure, corrosion, and environmental parameters applied thereto comprising:
   an inner conductor extending a length of the coaxial cable sensing device;
   an outer conductor extending the length of the coaxial cable sensing device; and
   an insulating material disposed between the inner conductor and the outer conductor, said insulating material electrically insulating the outer conductor from the inner conductor;
   wherein at least one of the inner conductor and the insulating material includes three or more impedance discontinuities along its respective length;
   wherein the distance between two successive impedance discontinuities is equal to a predefined periodic distance within an acceptable tolerance;
   wherein the two successive impedance discontinuities are configured to generate resonant peaks and valleys in the frequency domain; and
   wherein the spectral positions of the peaks and valleys are indicative of specific functions of the cable characteristics and of the period of the discontinuities.

2. The coaxial cable Bragg grating sensing device of claim 1, wherein the insulating material is a dielectric material or a mixture of dielectric and conductive materials.

3. The coaxial cable Bragg grating sensing device of claim 2, wherein the physical deformations comprise dimensional changes of at least one of the inner conductor and the insulating material.

4. The coaxial cable Bragg grating sensing device of claim 2, wherein the material alterations comprise replacing part of the original material with another material of different electromagnetic properties in the at least one of the inner conductor and the insulating material.

5. The coaxial cable Bragg grating sensing device of claim 1, wherein the impedance discontinuities are either physical deformations or material alterations along the length of the at least one of the inner conductor and the insulating material.

6. An electrical frequency domain monitoring system, comprising:
   one or more of the coaxial cable Bragg grating sensing devices of claim 1;
   a microwave signal generator for generating an electromagnetic signal in the frequency domain; and,
   a microwave receiver for detecting signals from the Bragg grating sensing device;
   wherein at least one of the reflection frequency spectrum and the transmission frequency spectrum is acquired.

7. The coaxial cable Bragg sensing device of claim 6, further comprising at least one connector attached at an end of the cable, said connector permitting one or more external devices to transmit a signal into at least one of the inner conductor and the conductor and to measure the transmission and reflection frequency spectra of the coaxial cable sensing device; wherein the spectral positions of the resonant peaks and valleys are computed to measure strain, temperature, pressure, corrosion and environmental parameters applied thereto.

8. A method for detecting environmental properties of a target environment using a coaxial cable sensing device, said method comprising:
   identifying one or more environmental properties of the target environment for detection;
   determining a calibration curve for the coaxial cable sensing device with respect to the target environment for each identified environmental property;
   positioning the coaxial cable sensing device in the target environment, said coaxial cable sensing device having periodic impedance discontinuities along its length;
   interrogating the coaxial cable sensing device to detect frequency changes of the coaxial cable sensing device;
   measuring said frequency changes of the coaxial cable sensing device; and analyzing the measured frequency changes against the each calibration curve.

9. The method of claim 8, wherein the calibration curve for each identified environmental property includes baseline information for the coaxial cable with respect to the identified environmental property.

10. The method of claim 8, wherein analyzing the measured frequency changes comprises identifying deviations between the measured frequency changes, said deviations indicative of a change in the identified environmental property.

11. The method of claim 10, wherein the analyzed frequency changes indicate a change in at least one of a temperature, a pressure, a strain, or acoustic waves in the target environment.

12. An automated system for manufacturing a coaxial cable sensor having a plurality of impedance discontinuities periodically spaced along its length, with each adjacent discontinuity having the same predefined period distance between it and the next adjacent discontinuity, said coaxial cable sensor having an inner conductor, an insulating material disposed around the inner conductor, and an outer conductor disposed around the insulating material, said system comprising:

a coaxial cable positioned on a platform by at least a first cable guide and a second cable guide, said coaxial cable introduced into the automated system by the first cable guide;

a coaxial cable spooler for pulling the coaxial cable through the first cable guide and the second cable guide;

a discontinuity creation device for creating periodic impedance discontinuities in the coaxial cable as the coaxial is pulled through the first cable guide and the second cable guide, said discontinuity creation device positioned between the first cable guide and the second cable guide;

an imaging device for acquiring an image of each created discontinuity, said imaging device positioned between the discontinuity creation device and the second cable guide, said imaging device positioned at a predetermined distance from the discontinuity creation device; and a computing device for determining the distance between two adjacent discontinuities created by the discontinuity creation device and synchronizing the rate of spin of the cable spooler based on the determined distance between the two adjacent discontinuities and determined distance between the imaging device and the discontinuity creation device to move the coaxial cable a distance equal to the predefined period distance within an acceptable tolerance.

13. The system of claim 12, wherein the first and second cable guides comprise double-sides, spring-driven clamps exerting a substantially constant force on the cable.

14. The system of claim 12, wherein the discontinuity created by the discontinuity creation device is a physical deformation to at least one of the inner conductor, the insulating material, and the outer conductor of the coaxial cable at a point on the coaxial cable as it is pulled through the first cable guide and the second cable guide by the cable spooler controlled by the computing device.

15. The system of claim 14, wherein the discontinuity creation device creates the physical deformation by placing a deformed metal sleeve around the coaxial cable at a point on the coaxial cable, said deformed metal sleeve causing a dimensional change to the coaxial cable.

16. The system of claim 12, the discontinuity created by the discontinuity creation device is a material alteration of the at least one of the inner conductor, insulating material, and the outer conductor at a point on the coaxial cable as it is pulled through the first cable guide and the second cable guide by the cable spooler controlled by the computing device.

17. The system of claim 16, wherein the material alterations comprise one or more holes in the at least one of the inner conductor, the insulating material, and the outer conductor.

18. The system of claim 17, wherein the discontinuity creation device includes a laser for forming the holes in the at least one of the inner conductor, the insulating material, and the outer conductor.

* * * * *